United States Patent Office.

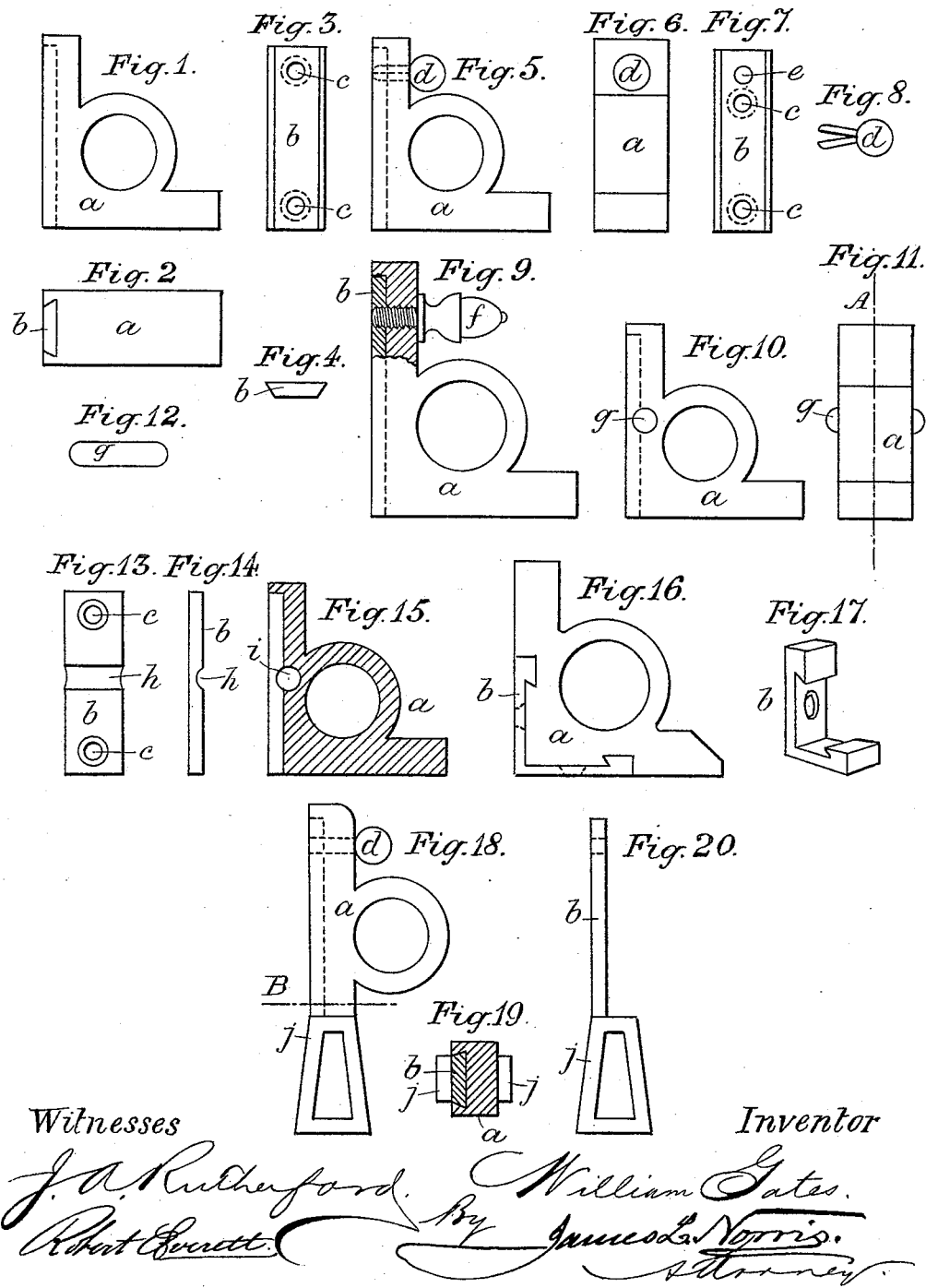

WILLIAM GATES, OF UPTON MANOR, ENGLAND.

STAIR-ROD AND SECURER.

SPECIFICATION forming part of Letters Patent No. 484,708, dated October 18, 1892.

Application filed November 9, 1891. Serial No. 411,305. (No model.)

*To all whom it may concern:*

Be it known that I, WILLIAM GATES, a subject of the Queen of Great Britain, residing at Upton Manor, England, have invented certain new and useful Improvements in and connected with Stair-Eyes; and I do hereby declare that the following is a full, clear, and exact description of the invention, which will enable others skilled in the art to which it appertains to make and use the same.

This invention has for its object to provide a new and improved stair-eye for retaining the ordinary carpet-rod; and it consists in the features of construction and the combination or arrangement of devices hereinafter described and claimed, reference being made to the accompanying drawings, in which—

Figure 1 is a side view, and Fig. 2 is a view of the under side, of a stair-eye and holding-plate formed according to my invention. Fig. 3 is a face view of the holding-plate, shown separately; and Fig. 4 is an end view thereof. Fig. 5 is a side view, and Fig. 6 is a front view, of a stair-eye and holding-plate similarly formed, locked together by a pin passing through holes therein. Fig. 7 is a face view of the holding-plate, shown separately; and Fig. 8 is a separate view of the locking-pin. Fig. 9 is a side view, partly in section, of a stair-eye and holding-plate formed according to my invention and locked together by a screw. Fig. 10 is a side view of a stair-eye and holding-plate formed according to my invention and locked together by a pin engaging in recesses therein. Fig. 11 is a front view of the same. Fig. 12 is a separate view of the locking-pin. Fig. 13 is a face view of the holding-plate, shown separately. Fig. 14 is an edge thereof, and Fig. 15 is a section of the stair-eye alone, the section being taken on the line A, Fig. 11. Fig. 16 is a side view of a stair-eye engaged with a modified form of holding appliance; and Fig. 17 is a perspective view of the said appliance, shown separately. Fig. 18 is a side view of a stair-eye and holding appliance formed according to my invention and adapted for application to stone stairs. Fig. 19 is a transverse section thereof, taken on the line B, Fig. 18; and Fig. 20 is a side view of the holding appliance, shown separately.

The stair-eye is marked $a$, and the holding plate or appliance is marked $b$, in all the figures of the drawings in which the said parts are shown.

In the arrangement illustrated in Figs. 1 and 2 the stair-eye has an undercut recess formed longitudinally in the back thereof, and the holding-plate is formed to fit the said recess, and has countersunk holes $c\ c$ formed in it to admit of its being secured to the rise of a stair by means of ordinary wood-screws. When the said plate $b$ is so secured, the eye $a$ is applied to the stair by being slid downward over the said plate until the under side of the eye rests on the face of the stair-tread. The friction between the recess in the eye and the holding-plate $b$ when they are thus engaged together prevents displacement of the eye by pressure of the carpet-rod in the direction in which the said rod is forced by the strain on the carpet when laid.

Where from any cause the friction between the holding-plate and the recess in the stair-eye is insufficient to retain the stair-eye in place, I lock the eye and the holding-plate together, as illustrated in Figs. 5 and 6 of the accompanying drawings—that is to say, by means of a pin $d$, passing through a hole in the eye and into a hole $e$ (see Fig. 7) in the holding-plate. I prefer to use for this purpose a split pin, such as is illustrated in Fig. 8. Or I lock the eye to the holding-plate by means of a screw engaged in coincident screwed holes formed in the eye and in the said plate. This arrangement is illustrated in Fig. 9, in which figure the screw is marked $f$. Or I lock the eye to the holding-plate as illustrated in Figs. 10 and 11—that is to say, I lock the said parts together by passing a pin $g$ (shown separately in Fig. 12) into coincident recesses formed transversely in the back of the eye and in the face of the holding-plate. The locking recess in the face of the holding-plate is marked $h$ in Figs. 13 and 14, and the locking recess in the back of the stair-eye is marked $i$ in Fig. 15. Or I form undercut recesses transversely in the back and under side of the stair-eye and make the holding appliance of such shape that the said recesses in the stair-eye may be engaged with the said appliance by a lateral motion, and when so engaged are incapable of being separated by force applied in the direction in which the carpet-rod is pressed by tension of the carpet. Fig. 16 illustrates in side view an eye having recesses thus formed in it and engaged with a holding appliance of the said shape, which holding appliance is shown separately in Fig. 20.

The holding plates and appliances illustrated in the figures of the drawings hereinbefore described are designed for application to wooden stairs. Where the said plates or appliances are required to be secured to stone stairs, I form dowels on them to admit of their being fixed by means of lead in holes formed in the stairs.

A stair-eye secured to a holding appliance having a dowel formed on it to admit of its being fixed to stone stairs is illustrated in Figs. 18, 19, and 20, the said dowel being marked $j$ in the said figures.

My said invention admits of stair-eyes being readily removed from stairs when required for the purpose of cleaning the eyes or the stairs or for other purpose.

Having thus described my invention, I wish it to be understood that I do not limit myself to the precise details hereinbefore described and illustrated in the accompanying drawings, as the said details may be varied without departing from my invention; but

I claim as my said invention—

1. The combination of a holding-plate for attachment to part of a stairway and a carpet-rod eye of ordinary outward form for the reception of an ordinary carpet-rod, the said eye having recesses to engage said holding-plate, substantially as described.

2. The combination of a holding-plate for attachment to the riser of a stair and a carpet-rod eye of ordinary outward form for the reception of an ordinary carpet-rod, the said eye having recesses to engage said holding-plate, said holding-plate and eye formed with coincident holes or recesses for the reception of a pin or screws, whereby the eye may be locked to the holding-plate, substantially as described.

WILLIAM GATES.

Witnesses:
WILLIAM THOMAS WHITMAN,
JOHN ALFRED DONNISON.